US011922421B2

(12) United States Patent
Gupta et al.

(10) Patent No.: US 11,922,421 B2
(45) Date of Patent: Mar. 5, 2024

(54) SYSTEMS AND METHODS FOR PATTERN IDENTIFICATION WITH ENHANCED EVENT STREAM PROCESSING

(71) Applicant: Ulfberht Labs Corp., Jersey City, NJ (US)

(72) Inventors: Menish Gupta, Jersey City, NJ (US); Sai Pavan Kumar Chitti, Jersey City, NJ (US); Jose Escolano-Carrasco, Brooklyn, NY (US); Ankur Malik, Jersey City, NJ (US)

(73) Assignee: Ulfberht Labs Corp., Jersey City, NJ (US)

( * ) Notice: Subject to any disclaimer, the term of this patent is extended or adjusted under 35 U.S.C. 154(b) by 0 days.

(21) Appl. No.: 17/523,781

(22) Filed: Nov. 10, 2021

(65) Prior Publication Data

US 2023/0145360 A1 May 11, 2023

(51) Int. Cl.
*G06Q 20/40* (2012.01)
*G06F 8/34* (2018.01)
*G06F 8/35* (2018.01)
*H04L 67/10* (2022.01)
*H04L 9/40* (2022.01)

(52) U.S. Cl.
CPC .......... *G06Q 20/4016* (2013.01); *G06F 8/34* (2013.01); *G06F 8/35* (2013.01); *H04L 67/10* (2013.01)

(58) Field of Classification Search
CPC .................................................. G06Q 20/4016
See application file for complete search history.

(56) References Cited

U.S. PATENT DOCUMENTS

| 9,047,608 | B1* | 6/2015 | Einav | G06Q 30/018 |
| 9,767,651 | B2* | 9/2017 | Fine | G07F 17/3225 |
| 11,182,687 | B1* | 11/2021 | Blumenfeld | G06F 16/9024 |
| 2012/0272221 | A1* | 10/2012 | Pessoa | G06F 9/4492 |
|  |  |  |  | 717/127 |
| 2015/0170254 | A1* | 6/2015 | Van Biljon | G06Q 30/06 |
|  |  |  |  | 705/26.81 |
| 2020/0402058 | A1* | 12/2020 | Zhou | G06Q 20/385 |
| 2021/0256808 | A1* | 8/2021 | Palmisano | G07F 17/3255 |
| 2022/0121967 | A1* | 4/2022 | Azizsoltani | G06N 5/025 |

* cited by examiner

*Primary Examiner* — Bruce I Ebersman
*Assistant Examiner* — Bhavin D Shah
(74) *Attorney, Agent, or Firm* — HICKMAN BECKER BINGHAM LEDESMA LLP

(57) ABSTRACT

Techniques are described herein for pattern identification using enhanced event stream processing. In an embodiment, an event instance is received via a programming interface, the event instance representing an occurrence of a corresponding type of real-world event and comprising one or more variable values pertaining to the occurrence. A ruleset is periodically evaluated as applied to the event instance including, for each of one or more reevaluations of the ruleset as applied the event instance, binding one or more variables of one or more rules of the ruleset to one or more variable values of the event instance and binding one or more other variables of one or more rules of the ruleset to one or more just-in-time variable values, the one or more just-in-time variable values received via one or more programming interfaces in context of the reevaluation.

12 Claims, 3 Drawing Sheets

… (1)

SYSTEMS AND METHODS FOR PATTERN IDENTIFICATION WITH ENHANCED EVENT STREAM PROCESSING

FIELD OF THE INVENTION

The present invention relates to computer security. Another technical field is computer systems and data processing methods programmed to perform pattern identification using event stream processing. Yet another technical field is computer-implemented systems and methods programmed to perform enterprise fraud management.

BACKGROUND

Detecting fraudulent activity often requires a large amount of data that is accumulated by multiple computer systems over a large period of time. For example, a single person or a group of fraudsters may open 50 to 100 accounts at approximately the same time or otherwise in concert (e.g., for car insurance or for credit cards). At opening, the accounts look legitimate and do not appear connected to each other from the perspective of an insurer or creditor, making fraudulent activity nearly impossible to detect at this point in time.

Sometime later, one or more of the created accounts will become flagged by a fraud detection system, which indicates that account is suspected of fraudulent activity. As an example, for a credit card account, the actions of slowly racking up credit charges over time and then defaulting on payment may be indicative of fraud.

It may take weeks and many data points for a fraud detection system to determine whether a single account is fraudulent. For bad actors who open many fraudulent accounts, many computer and business resources may be wasted on existing fraud detection techniques before fraud can be detected and remedied. Thus, identifying fraudulent activity as quickly as possible is paramount in conserving computer and business resources. Techniques are desired to detect fraudulent activity more quickly and efficiently than previous approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
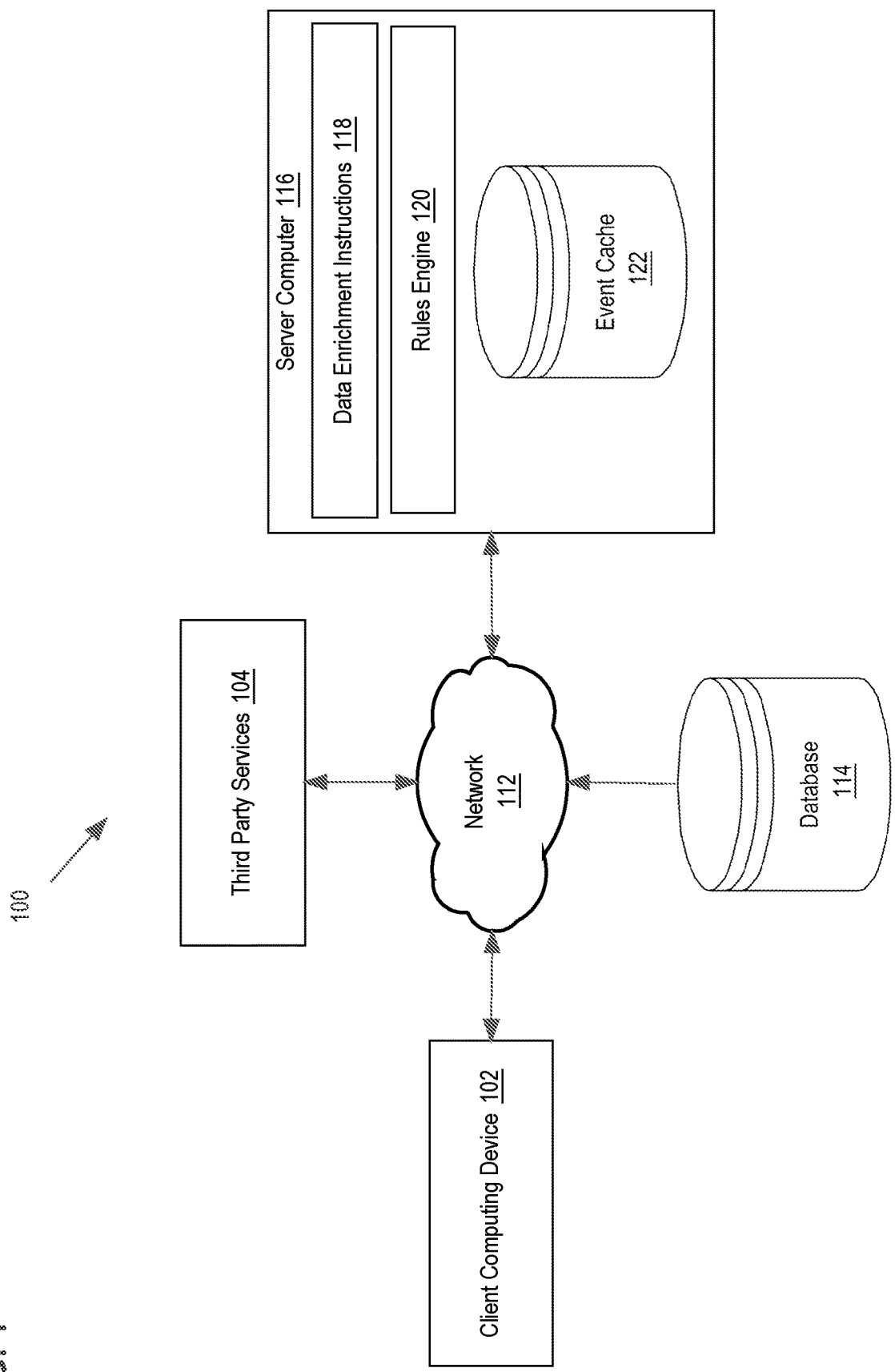
FIG. 1 illustrates a block diagram of an example computer system architecture in accordance with an embodiment of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for pattern identification with enhanced event stream processing. The techniques involve receiving event instances that represent occurrences of corresponding types of real-world events. Event instances comprise variable values pertaining to the occurrence of an event. Such event instances are stored in a cache for a specified amount of time.

A ruleset comprising a collection of rules is created. Each rule comprises a set of one or more variables and a Boolean expression that is defined in terms of the set of one or more variables. The output labels of a rule can evaluate to true, false, or error. A rule can bind a variable to a value that is obtained from a lookup application programming interface (API). Variables of a rule that are not bound to a lookup API are bound to variables of an event instance.

The ruleset is periodically reevaluated as applied to an event instance. For example, the ruleset may be revaluated once every hour for 24 hours as applied to an event instance. During each reevaluation of the ruleset, a variable of a rule of the ruleset may be bound to a variable value of the event instance. Additionally, another variable of a rule of the ruleset may be bound to a just-in-time variable value that is received via a programming interface in context of the respective reevaluation.

Just-in-time variable values are dynamic, meaning that a just-in-time variable value can change or update between each evaluation of a ruleset. Thus, each time a ruleset is evaluated, the output labels of rules of a ruleset can change. As an example, a graph API may be provided that provides access to just-in-time variable values that describe a graph. The graph may include nodes that represent event instances and edges between the nodes that represent relationships between the event instances. As such a graph is continuously updated over time, variable values that are accessible via the graph API may also be updated that provide additional insight into activity that is related to the event instances and the relationships between event instances that are represented by the graph.

Each evaluation of the ruleset results in the generation of output labels for each rule of the ruleset. Based on the output labels of the rules of the ruleset, fraudulent activity can be detected. For example, if an output label of any single rule of a ruleset matches a specified label, fraudulent activity is detected. As another example, if a threshold amount of output labels of rules of a ruleset match a specified label, fraudulent activity is detected. Alerts may be generated that indicate a presence or degree of fraudulent activity.

By continuously reevaluating rulesets that include rules with variables that are bound to event instance variable values and just-in-time variable values, fraudulent activity can be identified as early as possible, providing an enhanced timeframe to restrict or destroy fraudulent accounts.

System Overview

FIG. 1 illustrates an example networked computer system with which various implementations may be practiced. FIG. 1 is shown in simplified, schematic format for purposes of illustrating a clear example and other implementations may include more, fewer, or different elements. System 100 comprises various entities and devices which may be used to practice an implementation. Network 112 is a network entity which facilitates communication between entities depicted in FIG. 1. Connection to network 112 is show by double-sided arrows between a connecting entity and network 112. Network 112 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Client computing device 102 is a device/entity which allows a user to transmit event instances to server computer 116. Client computing device 102 may be any computing device capable of connection to network 102 through any method described herein. Client computing device 102 may comprise various programs, modules, or software applications that are configured to communicate with an application programming interface (API) associated with server computer 116 to transmit event instances to server computer 116. In some embodiments, client computing device 102 may represent a financial institution that offers lines of credit, loans, and/or insurance quotes through an electronic software platform.

Server computer 116 is connected to network 116 and is an entity which facilitates data enrichment techniques and application of a rules engine 120. Server computer 116 may be any hardware, software, virtual machine, or general-purpose entity capable of performing the processes discussed herein. In various implementations, the server computer 116 executes data enrichment instructions 118 and rules engine 120, the functions of which are described in other sections herein. The server computer 116 may also execute additional code, such as code for receiving digital data such as event instances from client computing device 102 and third party services 104. Server computer 116 may also be configured to store digital data such as event instances in event cache 122 and database 114.

The data enrichment instructions 118 may be programmed or configured to receive and enrich event instances. For example, the data enrichment instructions 118 may include instructions to receive event instances from client computing device 102 and store the received event instances in database 114 and/or event cache 122. The data enrichment instructions 118 may query APIs of third party services 104 using values from event instances to further enrich event instance data. For example, upon receiving an event instance from client computing device 102, data enrichment instructions 118 may query an API of a third party service 104 using a value from a variable of the received event instance to retrieve further data points that relate to values of the event instance. Event enrichment instructions 118 may be configured to store event instances in database 114 or in event cache 112 for a set amount of time according to a configurable event cache policy. The data enrichment instructions 118 may also be used for implementing aspects of the flow diagrams that are further described herein.

The rules engine 120 may be programmed or configured to create rulesets and apply rulesets to event instances. For example, the rules engine 120 may be configured to create rulesets comprising one or more rules that specify conditional logic to be applied against event instance variables and store the rulesets in database 114. The rules engine 120 may be configured to apply such rulesets to event instance variables to generate an output on a periodic basis. During evaluation of a ruleset, the rules engine 120 may be configured to access third party services 104 via APIs to retrieve variable values that are bound to one or more rules of the ruleset, as further discussed herein. The rules engine 120 may also be used for implementing aspects of the flow diagrams that are further described herein.

Event cache 122 may be any number of individual or linked storage devices or mediums which allow the storage of digital data related to event instances. Event cache 122 may be configured to store event instances for a set amount of time.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 116.

Third party services 104 comprises one or more applications or services that each provide an API. When queried by server computer 116, such APIs may provide additional digital data for data enrichment operations and/or the application of rulesets as discussed herein. In one embodiment, third party services 104 comprises a graph engine that provides a graph API. The graph engine may create a graph based on one or more event instances and provide data points that describe properties or metrics of the graph via the graph API. In some embodiments, such a graph may be generated and updated by server computer 116. The configuration and functionality of such a graph is further discussed herein.

Database 114 may be any number of individual or linked storage devices or mediums which allow the storage of digital data related to event instances and/or rulesets. Database 114 may some digital data comprising a blacklist that includes a list of users and/or attributes associated with users.

Event Data

An event represents a type of real world happening (e.g., applying for car insurance) and is defined by a set of one or more variables (i.e., an unordered set of variables). A variable comprises a single data unit type such as, for example, a phone number, an e-mail address, an IP address, a zip code, a geo-IP location. A variable value comprises a value of a data type such as, for example, '1-408-414-1231' is a variable value of the 'phone number' variable, 'johndoe@gmail.com' is a variable value of the 'email address' variable.

An event instance is an occurrence of an event. For example, an event may represent a user opening an account, a user changing account information, a user account being issued an insurance quote, a user filing an insurance claim. An event instance of a user opening an account may comprise variables such as Name, Address, Phone Number, User Preferences. Variable values for the event instance may include Name: John Doe, Phone Number: 999-999-9999, User Preferences: Admin, etc.

A schema that describes how events are received by server computer 116 can be defined by an admin of server computer. Server computer 116 may provide an API, that implements the schema, to external clients. The external clients can utilize the API to submit event instances to server computer 116.

Additionally, a schema may define an external lookup for some variables. In this case, when an event instance is received, an external lookup API such as an API offered by third party services 104, may be queried by server computer 116 to retrieve additional variable values that relate to the event instance. For example, a lookup API may be queried using a phone number variable value that was received as part of an event instance. In response, the lookup API may provide additional data to supplement variable values of the event instance such as providing name and location information based on the provided phone number.

Event Data Enrichment

Once event instances are received by server computer 116, the event instances can be enriched with additional data using a variety of techniques. As discussed above, one data enrichment technique includes querying external APIs to retrieve additional data that relates to the event instance. For example, a variable value from an event instance may be used as a basis for querying an external lookup API to retrieve one or more additional variable values to supplement or enrich the event instance with more data.

Another data enrichment technique includes generating and periodically updating a graph that represents event instances and connections between event instances. In a graph, each node represents entities such as event instances and each edges between nodes represent relationships between the entities, such as a variable value that two event instances have in common. For example, each node in a graph may represent an application to open an insurance policy and each edge in the graph may represent a cookie or e-mail address that two nodes have in common. Such relationships that are represented by edges may be indicative of fraud. Thus, a graph may exist with one hundred nodes that each represent an application to open an insurance policy that are linked together in the graph because the applications are associated with the same e-mail address or the same browser cookie. Data, variables and/or metrics that describe the graph can be made available to external sources via a graph API.

A graph may be represented by variable values including a size of the graph, a density of the graph that indicates a number of edges in the graph divided by a number of possible edges in the graph, a structure of the graph, temporal variables of the graph such as how fast the graph is evolving, attributes of nodes and/or edges of the graph, and other metrics relating to nodes and/or edges of the graph. For example, a size of a graph may be '6' indicating that the graph has 6 nodes. A density of a graph may be '0.6' indicating that there are 6 edges in a graph that has 10 possible edges. A burstiness temporal variable of a graph may indicate that a graph has grown an average of 4 nodes per day over the last 5 days. Another metric of a graph may indicate that the average income for all users in the graph is $50,000, based on averaging the income for each user identified in the graph.

A graph may be configured to be updated periodically on a schedule. For example, a graph may be configured by a system administrator to update once every hour of a day. Each time the graph updates, additional nodes and edges between nodes may be added to reflect newly received event instances and their relationship to previously received event instances.

Rules and Rulesets

A rule comprises a set of one or more variables and a Boolean expression that is defined in terms of the set of one or more variables. The output labels of a rule can evaluate to true, false, or error. A rule can also bind a variable to a value that is obtained from a lookup API. Variable values that are received from an API in context of a rule or ruleset evaluation are referred to herein at "just-in-time variable values". Variables of a rule that are not bound to a lookup API are bound to variables of an event instance to which a ruleset that incorporates the rule is applied.

A ruleset is a collection of rules that is applied to an event. For example, an event might represent account registration. A ruleset then represents the set of rules to apply to instances of that event. The rules of the collection can be configured to be executed using different execution strategies. For example, a ruleset can be configured according to a sequential first match strategy where rules of a ruleset will be run in sequence and execution will stop after a first match, a sequential all match strategy where rules of a ruleset run in sequence and all rules of the ruleset will be evaluated, or a parallel all match strategy where all rules of a ruleset will run in parallel and all rules of the ruleset will be evaluated.

For example, a ruleset may include the following rules: (a) Is size of graph>threshold value? (b) Is user recently deceased? (c) Does user address match a blacklist address? (d) Is user IP address coming from a known party?

A ruleset may be configured to be evaluated periodically on a schedule. For example, a ruleset may be configured by a system administrator to be evaluated twice per 24 hour time frame. Because a rule of a ruleset can bind a variable to a lookup API such as a graph API or other external API, variable values can change with each ruleset evaluation which can cause the output of rulesets evaluations to change.

Enhanced Event Stream Processing

Once an event instance is received by server computer 116, the event instance is stored in an event cache. The event cache is configured to store event instances for a set amount of time. A ruleset is evaluated by applying the ruleset to the event instance that is retrieved from the event cache. The ruleset set is periodically reevaluated as applied to the event instance. The period of reevaluation may be set by a system administrator. During each evaluation of the ruleset, one or more variables of one or more rules of the ruleset are bound to one or more variable values of the event instance. One or more other variables of one or more rules of the ruleset are bound to one or more just-in-time variable values. The one or more just-in-time variable values are received from an API, such as a graph API.

Just-in-time variable values can be updated or changed over time by their respective services or applications. Thus, because one or more variables of one or more rules of the ruleset are bound to one or more just-in-time variable values that are received from an API, each periodic reevaluation of the ruleset may result in different outputs from one or more rules of the ruleset. For example, assume a particular rule of a ruleset is bound to a particular just-in-time variable value that is received from a graph API. If the particular just-in-time variable is defined as a 'graph size' variable, and the 'graph size' value increases between evaluations of the ruleset, then it is possible that a rule that specifies a specific graph size will fail. More specifically, for a rule that specifies "graph size<2", if during a first evaluation of the ruleset, the received 'graph size' variable value is '1', and during a later-in-time second evaluation of the ruleset, the received 'graph size' variable is '2', then the same rule of the ruleset will evaluate to 'false' in the second evaluation, as opposed to 'true' in the first evaluation.

The evaluation of rulesets as applied to event instance variable values and just-in-time variable values can be indicative of fraudulent activity. A configuration of a ruleset determines what combinations of outputs of rules, or lack thereof, indicate fraud. For example, for a specific rule of a ruleset that is bound to a just-in-time variable value, if the output of the rule is 'false', then the corresponding event instance may be flagged as fraudulent.

Combinations of outputs of rules that are bound to just-in-time variable values as well as event instance variable values can be indicative of fraudulent activity. As an example, for a first rule of a ruleset that is bound to a just-in-time variable value and a second rule of the ruleset that is bound to a variable value of an event instance, if the output of the first rule is 'false' and the output of the second rule is 'true' then the corresponding event instance may be flagged as fraudulent.

In one embodiment, a degree of fraudulent activity of an event instance is determined based on the number of rules of a ruleset that evaluates to a particular output label. For example, if a ruleset includes 50 rules and during an evaluation of the ruleset, 20 of the 50 rules have an output label of 'true', this may indicate a high degree of fraudulent activity of an event instance. Additionally, the evaluation of certain rules in a ruleset and corresponding output labels may be more indicative of fraudulent activity than other rules in the ruleset. Accordingly, certain rules of a ruleset may be weighted as part of determining a degree of fraudulent activity. Thus, determining a degree of fraudulent activity of an event instance may be based on the number of rules of a ruleset that evaluates to a particular output label and/or weights assigned to each rule of the ruleset. In some embodiments, a degree of fraudulent activity may be represented by a numeric value such as a score value that represents how many rules of a rules produced output labels of a certain value.

In some embodiments, certain rules of a ruleset that are bound to just-in-time variable values, such as a variable values received from a graph, are assigned greater weight than rules of the ruleset that are bound to variable values other than just-in-time variable values as part of determining a degree of fraudulent activity.

Example Procedure

Figure 2:
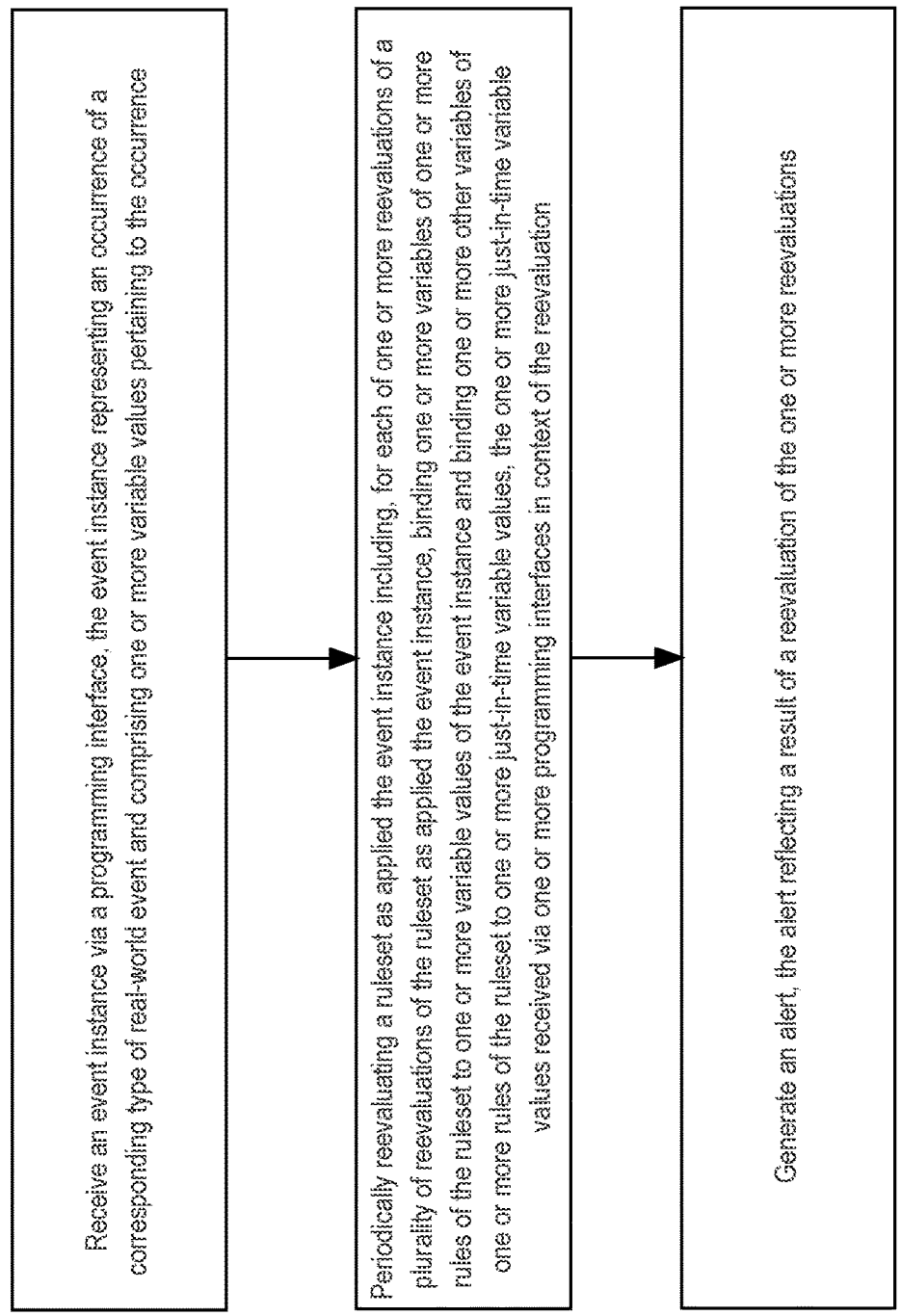
FIG. 2 illustrates a flow chart of an example flow diagram of an example process in accordance with an embodiment of the disclosure.

Referring to FIG. 2, it is a flowchart illustrating the general steps for pattern identification detection using enhanced event stream processing, according to an embodiment.

At step 202, an event instance is received via a programming interface, the event instance representing an occurrence of a corresponding type of real-world event and comprising one or more variable values pertaining to the occurrence. In one embodiment, the event instance is cached for a specific amount of time.

At step 204, a ruleset is periodically reevaluated as applied the event instance including, for each of one or more reevaluations of a plurality of reevaluations of the ruleset as applied the event instance, binding one or more variables of one or more rules of the ruleset to one or more variable values of the event instance and binding one or more other variables of one or more rules of the ruleset to one or more just-in-time variable values, the one or more just-in-time variable values received via one or more programming interfaces in context of the reevaluation. In one embodiment, the one or more programming interfaces includes a graph programming interface that provides access to one or more graph variable values that describe a graph. The graph includes nodes that represent event instances and edges between the nodes that represent relationships between event instances.

At step 206, an alert is generated, the alert reflecting a result of a reevaluation of the one or more reevaluations. Server computer 116 may generate an alert that indicates an IP address or other identifier of a user account that associated with the event instance that is detected as fraudulent. For example, a message, notification, or alert that indicates that a user account is or may be associated with fraudulent activity may be transmitted. Such a message, notification, or alert may be sent to client computing device 102 that indicates that a user account associated with the event instance is or may be associated with fraudulent activity. In some embodiments, the message, notification, or alert may programmatically cause the client computing device 102 to cease or restrict any lines of credit or loans that are associated with the user account.

As an example, at 9 am User A opens an account (Event Instance 1). Also at 9 am, a graph is updated to include Event Instance 1 as a node of the graph. Also at 9 am, ruleset A, which includes a first variable that is bound to a value from Event Instance 1 and a second variable that is bound to a just-in-time variable value from the graph, is run against Event Instance 1 and the graph, and passes. At 10 am, the graph is updated to include information about accounts that were since opened by User B and User C (Event Instances 2 and 3) using the same e-mail address that User A used at 9 am to open the account of Event Instance 1. At 11 am, ruleset A is run again against Event Instance 1 and the graph, and this time the ruleset triggers a potential fraud alert. Because the just-in-time variable represented by the graph changed between periodic evaluations of the ruleset due to additional information being added to the graph, the application of the ruleset in periodic intervals is able quickly identify fraudulent activity associated with Event Instance 1.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
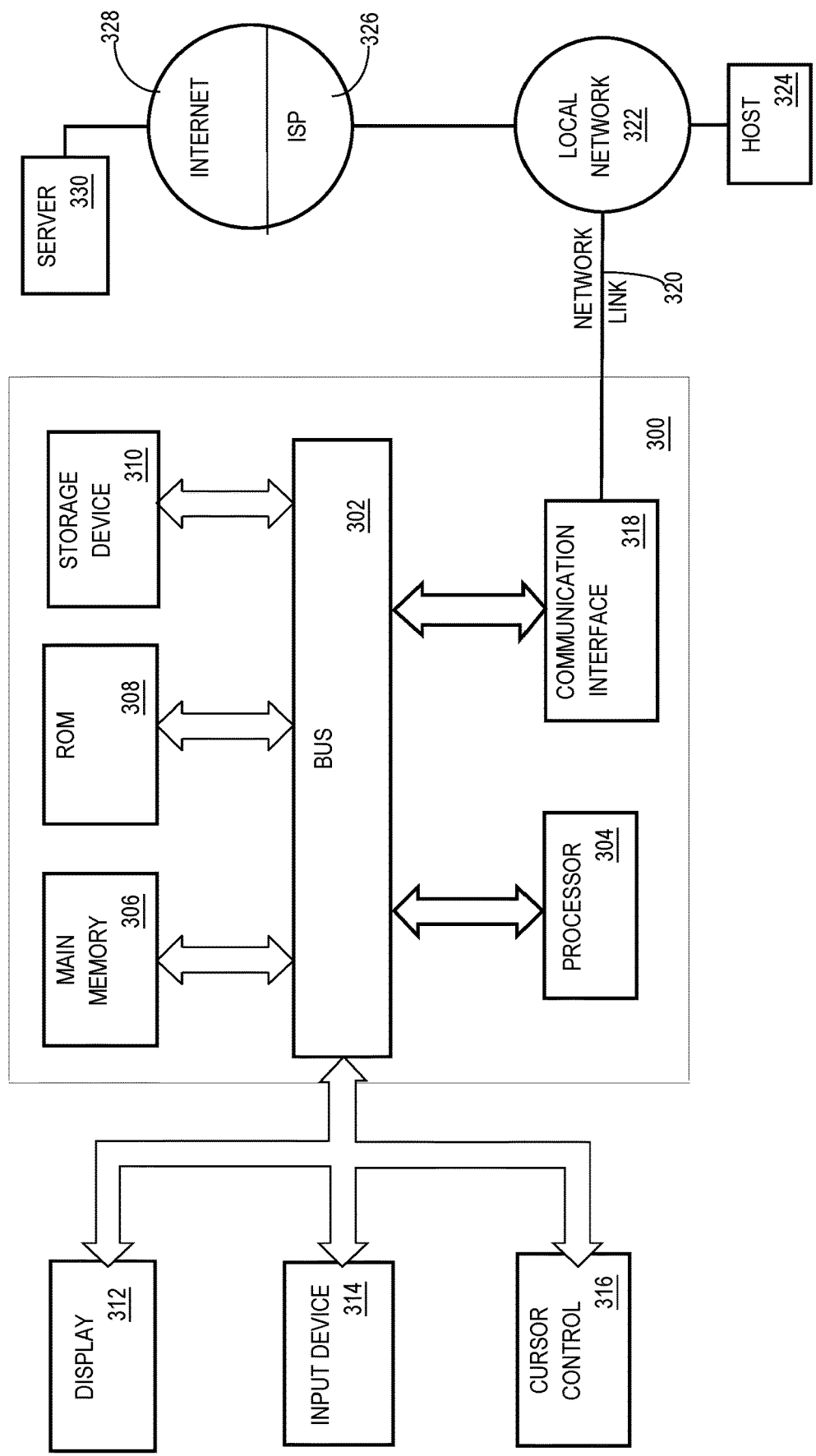
FIG. 3 is a block diagram of a computer system upon which the techniques described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, by a server, an event instance via a programming interface, the event instance representing an occurrence of a corresponding type of real-world event and comprising one or more variable values pertaining to the occurrence, the event instance stored in an event cache of the server;
   periodically applying conditional logic via a rules engine in the server to a ruleset as applied to the event instance including, for each of one or more applications of the ruleset to the event instance:
      binding one or more variables of one or more rules of the ruleset to one or more variable values of the event instance, and
      binding one or more other variables of the one or more rules of the ruleset to one or more just-in-time variable values, the one or more just-in-time variable values received via one or more programming interfaces in context of the application of the ruleset, wherein the one or more programming interfaces includes a graph programming interface that provides access to one or more variable values that describe a graph, the graph including nodes that represent event instances and edges between the nodes that represent relationships between event instances; and
   generating an alert, the alert reflecting a result of the application of the conditional logic to the ruleset, wherein the alert reflecting the result of the application of the conditional logic to the ruleset includes:
      a first application of the conditional logic to that ruleset that includes a particular rule that is bound to a particular just-in-time variable value, and
      a second application of the conditional logic to that ruleset that includes the particular rule that is bound to the particular just-in-time variable value;
      wherein the second application of conditional logic occurs later in time than the first application of conditional logic;
      wherein the first application of conditional logic includes applying the particular rule to obtain a first output label; and
      wherein the second application of conditional logic includes applying the particular rule to obtain a second output label that is different from the first output label; and
   determining a degree of fraudulent activity based on:
      a number of rules of the ruleset that evaluate to a particular output label, and
      weights assigned to each rule of the ruleset;
      wherein the one or more rules of the ruleset that are bound to the one or more just-in-time variable values are assigned greater weight than the one or more rules of the ruleset that are bound to the one or more variable values of the event instance for determining the degree of fraudulent activity; and
   wherein the alert is generated based on the degree of fraudulent activity.

2. The method of claim 1, wherein the event instance is cached for a particular period of time.

3. The method of claim 1, wherein the graph is configured to be updated on a periodic basis.

4. The method of claim 1, wherein the one or more just-in-time variable values include a particular variable value that describes a size property of a graph, the graph including nodes that represent event instances and edges between the nodes that represent relationships between event instances.

5. The method of claim 1, further comprising:
   generating the alert based on the second output label of the second application of conditional logic.

6. The method of claim 1, further comprising:
   determining a degree of fraudulent activity based on a number of rules of the ruleset that evaluate to a particular output label;
   wherein the alert is generated based on the degree of fraudulent activity.

7. A system comprising:
   one or more processors;
   one or more storage devices operatively coupled to the processor;

instructions, stored on the one or more storage devices, which, when executed by the one or more processors, cause:

receiving, by a server, an event instance via a programming interface, the event instance representing an occurrence of a corresponding type of real-world event and comprising one or more variable values pertaining to the occurrence, the event instance stored in an event cache of the server;

periodically applying conditional logic via a rules engine in the server to a ruleset as applied to the event instance including, for each of one or more applications of the ruleset to the event instance:

binding one or more variables of one or more rules of the ruleset to one or more variable values of the event instance, and binding one or more other variables of the one or more rules of the ruleset to one or more just-in-time variable values, the one or more just-in-time variable values received via one or more programming interfaces in context of the application of the ruleset, wherein the one or more programming interfaces includes a graph programming interface that provides access to one or more variable values that describe a graph, the graph including nodes that represent event instances and edges between the nodes that represent relationships between event instances; and generating an alert, the alert reflecting a result of the application of the conditional logic to the ruleset, wherein the alert reflecting the result of the application of the conditional logic to the ruleset includes:

a first application of the conditional logic to that ruleset that includes a particular rule that is bound to a particular just-in-time variable value, and a second application of the conditional logic to that ruleset that includes the particular rule that is bound to the particular just-in-time variable value;

wherein the second application of conditional logic occurs later in time than the first application of conditional logic;

wherein the first application of conditional logic includes applying the particular rule to obtain a first output label; and wherein the second application of conditional logic includes applying the particular rule to obtain a second output label that is different from the first output label; and determining a degree of fraudulent activity based on:

a number of rules of the ruleset that evaluate to a particular output label, and weights assigned to each rule of the ruleset;

wherein the one or more rules of the ruleset that are bound to the one or more just-in-time variable values are assigned greater weight than the one or more rules of the ruleset that are bound to the one or more variable values of the event instance for determining the degree of fraudulent activity; and wherein the alert is generated based on the degree of fraudulent activity.

8. The system of claim 7, wherein the event instance is cached for a particular period of time.

9. The system of claim 7, wherein the graph is configured to be updated on a periodic basis.

10. The system of claim 7, wherein the one or more just-in-time variable values include a particular variable value that describes a size property of a graph, the graph including nodes that represent event instances and edges between the nodes that represent relationships between event instances.

11. The system of claim 7, wherein the instructions further comprise instructions for:

generating the alert based on the second output label of the second application of conditional logic.

12. The system of claim 7, wherein the instructions further comprise instructions for:

determining a degree of fraudulent activity based on a number of rules of the ruleset that evaluate to a particular output label;

wherein the alert is generated based on the degree of fraudulent activity.

\* \* \* \* \*

UNITED STATES PATENT AND TRADEMARK OFFICE
CERTIFICATE OF CORRECTION

| | |
|---|---|
| PATENT NO. | : 11,922,421 B2 |
| APPLICATION NO. | : 17/523781 |
| DATED | : March 5, 2024 |
| INVENTOR(S) | : Menish Gupta et al. |

It is certified that error appears in the above-identified patent and that said Letters Patent is hereby corrected as shown below:

In the Claims

Column 13
Line 11: Claim 7, Delete "to a" and insert --to evaluate, a--

Signed and Sealed this
Second Day of April, 2024

Katherine Kelly Vidal
*Director of the United States Patent and Trademark Office*